(12) United States Patent
Yoon et al.

(10) Patent No.: US 9,816,016 B2
(45) Date of Patent: Nov. 14, 2017

(54) ADHESIVE COMPOSITION, POLARIZING PLATE AND LIQUID CRYSTAL DISPLAY DEVICE

(75) Inventors: Sung Soo Yoon, Daejeon (KR); No-Ma Kim, Daejeon (KR); In Ho Hwang, Daejeon (KR); Jeong Min Ha, Daejeon (KR); In Kyu Park, Daejeon (KR); Min Ki Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/155,176

(22) Filed: Jun. 7, 2011

(65) Prior Publication Data

US 2011/0234948 A1    Sep. 29, 2011

Related U.S. Application Data

(63) Continuation of application No. PCT/KR2009/007604, filed on Dec. 18, 2009.

(30) Foreign Application Priority Data

Dec. 18, 2008  (KR) ........................ 10-2008-0129485
Dec. 16, 2009  (KR) ........................ 10-2009-0125399

(51) Int. Cl.
| | |
|---|---|
| *G02F 1/1335* | (2006.01) |
| *C09J 133/06* | (2006.01) |
| *C09J 4/06* | (2006.01) |
| *C09J 7/02* | (2006.01) |
| *G02B 5/30* | (2006.01) |
| *C09J 133/12* | (2006.01) |
| *C09J 133/10* | (2006.01) |
| *C09J 133/08* | (2006.01) |

(52) U.S. Cl.
CPC ............. *C09J 133/066* (2013.01); *C09J 4/06* (2013.01); *G02F 1/133528* (2013.01); *B32B 2457/202* (2013.01); *C09J 7/0207* (2013.01); *C09J 7/0217* (2013.01); *C09J 133/08* (2013.01); *C09J 133/10* (2013.01); *C09J 133/12* (2013.01); *G02B 5/30* (2013.01); *G02F 2202/28* (2013.01); *Y10T 428/1059* (2015.01); *Y10T 428/1077* (2015.01); *Y10T 428/2891* (2015.01)

(58) Field of Classification Search
CPC ... B32B 17/10743; B32B 27/00; B32B 27/04; B32B 27/06; B32B 27/08; B32B 27/16; B32B 2457/202; C09J 2433/00; C09J 7/00; C09J 133/00; C09J 133/08; C09J 133/10; C09J 133/12; C09J 2201/00; C09J 2201/02; C09J 2203/326; C09J 133/066; C09J 4/06; C09J 7/0207; C09J 7/0217; G02F 2201/1533; G02F 2201/1536; G02F 2202/28; G02F 1/133528; Y10T 428/1059; Y10T 428/1077; Y10T 428/2891; G02B 5/30

USPC ............ 156/106, 331.7, 272.8; 349/96–103, 349/122–138; 427/208, 208.4, 208.6, 427/208.8, 207; 428/1.1, 520, 1.3, 1.5, 428/355 R, 355 EN, 355 BL, 355 AC, 428/356; 524/236, 356, 555, 556; 525/329.9, 330.5; 526/931

See application file for complete search history.

(56) References Cited

U.S. PATENT DOCUMENTS

| | | | |
|---|---|---|---|
| 6,524,701 B1 * | 2/2003 | Kondo et al. ......... | 428/355 RA |
| 7,198,831 B2 * | 4/2007 | Watanabe et al. ............. | 428/1.5 |
| 2004/0127594 A1 * | 7/2004 | Yang .................. | C08F 290/061 522/114 |
| 2005/0153079 A1 * | 7/2005 | Hieda ..................... | B32B 27/08 428/1.2 |
| 2006/0127606 A1 * | 6/2006 | Ogasawara et al. ........... | 428/1.3 |
| 2006/0162857 A1 * | 7/2006 | Nagamoto et al. ........ | 156/272.8 |
| 2006/0223938 A1 * | 10/2006 | Nagamoto et al. ............ | 524/556 |
| 2007/0055006 A1 * | 3/2007 | Kim et al. ..................... | 524/556 |
| 2007/0093577 A1 * | 4/2007 | Kim et al. ..................... | 524/262 |
| 2007/0148485 A1 | 6/2007 | Kusama et al. | |
| 2007/0166537 A1 | 7/2007 | Nagamoto et al. | |
| 2007/0190318 A1 * | 8/2007 | Asai et al. ..................... | 428/343 |
| 2008/0011419 A1 * | 1/2008 | Everaerts et al. ............. | 156/332 |
| 2008/0302479 A1 | 12/2008 | Barker et al. | |
| 2009/0162617 A1 * | 6/2009 | Moroishi ............. | G02B 5/0242 428/172 |

(Continued)

FOREIGN PATENT DOCUMENTS

| | | |
|---|---|---|
| CN | 1863885 | 11/2006 |
| CN | 1872933 | 12/2006 |

(Continued)

OTHER PUBLICATIONS

Takahashi et al., JP 08027239 A, English Translation Jan. 21,2009 from http://www4.ipdl.inpit.go.jp.*
Kashio, Mikihiro et al., JP 2001107005 A, English Translation Sep. 9, 2013 from http://dossier1.ipdl.inpit.go.jp.*
Takahashi et al., JP 2002-249752 A English Machine Translation provided by http://dossier1.ipdl.inpit.go.jp/AIPN/odse_top_dn.ipdl?N0000=7400.*
Sperling, Interpenetrating Polymer Networks, Encyclopedia of Polymer Science and Technology, 2004, pp. 272-311.*

*Primary Examiner* — Eli D Strah
(74) *Attorney, Agent, or Firm* — Dentons US LLP

(57) ABSTRACT

The present invention relates to a pressure-sensitive adhesive composition, a polarizing plate and a liquid crystal display. In the present invention, provided is a pressure-sensitive adhesive which can effectively prevent the light leakage resulting from dimensional changes of the polarizing plate, and the like, and exhibit excellent endurance reliability even when it is used or stored for a long time. Further, in the present invention, provided is the pressure-sensitive adhesive composition or the pressure-sensitive adhesive which can exhibit excellent physical properties, such as removability, workability, and the like.

15 Claims, No Drawings

(56) References Cited

U.S. PATENT DOCUMENTS

2011/0109848 A1* 5/2011 Yoon et al. .................. 349/96
2011/0149211 A1* 6/2011 Ha et al. ..................... 349/96
2011/0205469 A1* 8/2011 Ha et al. ..................... 349/96

FOREIGN PATENT DOCUMENTS

| | | | | |
|---|---|---|---|---|
| CN | 1990802 | | 7/2007 | |
| CN | 101033380 | | 9/2007 | |
| JP | 08027239 A | * | 1/1996 | ............ C08F 299/00 |
| JP | 10-279907 | | 10/1998 | |
| JP | 2001107005 A | * | 4/2001 | ............ C09J 133/08 |
| JP | 2002-047468 | | 2/2002 | |
| JP | 2002-249752 A | | 9/2002 | |
| JP | 2003-049141 | | 2/2003 | |
| JP | 2003-114331 | | 4/2003 | |
| JP | 2004-264333 A | | 9/2004 | |
| JP | 2006-058718 A | | 3/2006 | |
| JP | 2006-512442 A | | 4/2006 | |
| JP | 2006-309114 | | 11/2006 | |
| JP | 2006-335840 A | | 12/2006 | |
| JP | 2007-197659 | | 8/2007 | |
| JP | 2007-212995 | | 8/2007 | |
| JP | WO 2008105423 A1 | * | 9/2008 | ............ G02B 5/0242 |
| KR | 1998-079266 | | 11/1998 | |
| KR | 10-0813217 B1 | | 3/2008 | |
| WO | 2004/060946 A1 | | 7/2004 | |
| WO | WO 2010-021505 A2 | | 2/2010 | |

\* cited by examiner

ADHESIVE COMPOSITION, POLARIZING PLATE AND LIQUID CRYSTAL DISPLAY DEVICE

CROSS-REFERENCE TO RELATED APPLICATION

This application is a continuation of International Application No. PCT/KR2009/007604, filed Dec. 18, 2009, which claims priority to and the benefit of Korean Patent Application Nos. 2008-0129485, filed Dec. 18, 2008, and 10-2009-0125399, filed Dec. 16, 2009, which are hereby incorporated by reference for all purposes as if fully set forth herein.

BACKGROUND

1. Field of the Invention

The present invention relates to a pressure-sensitive adhesive composition, a polarizing plate, and a liquid crystal display.

2. Discussion of Related Art

A polarizing plate is a functional optical member included in a liquid crystal display (LCD). The polarizing plate has a multi-layered structure including a polarizer having iodine compounds or dichromatic polarizing materials arranged in a predetermined direction, and a protective film, such as triacetylcellulose (TAC), that is formed on both sides of the polarizer and functions as protecting the polarizer. Further, the polarizing plate may include an additional film such as a retardation plate, a wide viewing angle compensation plate, or a brightness enhancement film in view of functional improvement.

Each film constituting the multi-layered polarizing plate is made of a material having a different molecular structure and composition, and thus exhibits different physical properties. Therefore, the polarizing plate has inferior dimensional stability especially under high temperature and/or high humidity condition, since the film that has an unidirectional molecular arrangement and constitutes the polarizing plate shows a difference shrinkage or expansion behavior. Therefore, when the polarizing plate is fixed by a pressure-sensitive adhesive, birefringence is induced and light leakage is arisen with stress is concentrating on the TAC layer, and the like, under high temperature and/or high humidity.

To solve these problems, techniques for securing stress relaxation properties of a pressure sensitive adhesive by designing it so as to have high creep and be easily deformed, with respect to external stress have been disclosed (e.g. Korean Patent Application Publication No. 1998-079266, Japanese Patent Application Publication Nos. 2002-047468 and 2003-049141, and the like.).

However, the pressure-sensitive adhesive disclosed in the above techniques shows inferior cuttability, so that depression or sticking-out of the pressure-sensitive adhesive easily occurs when manufacturing the polarizing plate, and thus productivity and yield are remarkably reduced.

As another method of preventing the light leakage, methods, in which the pressure-sensitive adhesive is designed to be very hard is known. When the pressure-sensitive adhesive is designed to have a rigid physical property, the shrinkage and expansion of the polarizing plate under high temperature and/or high humidity are inhibited to a maximum extent, so that it is possible to minimize generation of stress, concentrate the stress on the outermost edge, and achieve relatively excellent optical properties.

For example, Japanese Patent Application Publication No. 2007-197659 discloses a technique of manufacturing a pressure-sensitive adhesive composition by formulating an acrylic resin having carboxyl group, multifunctional acrylate, an isocyanate hardener and a photo-initiator so as to prepare a pressure sensitive adhesive composition, and curing it by UV irradiation. Japanese Patent Application Publication No. 2007-212995 discloses a technique of manufacturing a pressure-sensitive adhesive composition by mixing a copolymer containing a hydroxy group with a copolymer containing a carboxyl group at a predetermined ratio, and adding multifunctional acrylate, a multifunctional isocyanate hardener and a photo-initiator so as to prepare a pressure sensitive adhesive composition, and curing it by UV irradiation.

However, the pressure-sensitive adhesives disclosed in the above documents, have problems that its initial adhesion strength is largely reduced according to its storage modulus, G', and thus its durability is greatly reduced.

SUMMARY OF THE INVENTION

The present invention is directed to a pressure-sensitive adhesive composition, a polarizing plate, and a liquid crystal display.

One aspect of the present invention provides a pressure-sensitive adhesive composition, which includes an interpenetrating polymer network structure and has a storage modulus (G') of 0.05 MPa to 0.3 MPa at 80° C. in a cured state.

Another aspect of the present invention provides a polarizing plate, which includes a polarizing film, and a pressure-sensitive adhesive layer that is formed on one or both surfaces of the polarizing film and included a cured product of the pressure-sensitive adhesive composition.

Still another aspect of the present invention provides a liquid crystal display that includes a liquid crystal panel, on one or both surfaces of which the polarizing plate is attached.

DETAILED DESCRIPTION OF EXEMPLARY EMBODIMENTS

The present invention is directed to a pressure-sensitive adhesive composition which includes an interpenetrating polymer network (hereinafter, referred to as "IPN") structure and has a storage modulus (G') of 0.05 MPa to 0.3 MPa at 80° C. in a cured state.

In one embodiment, the pressure-sensitive adhesive composition of the present invention may be effectively used as a pressure-sensitive adhesive composition for optical members, such as a polarizer.

Hereinafter, the pressure-sensitive adhesive composition will be described in greater detail.

In the present invention, the pressure-sensitive adhesive composition includes an IPN structure after curing, that is, in a cured state. The term "cured state of the pressure sensitive adhesive composition" as used herein refers to the state in which the pressure-sensitive adhesive composition is prepared as a pressure-sensitive adhesive by performing a light-irradiating, aging, drying, or heating process on the pressure sensitive adhesive composition. The term "light-irradiating" as used herein refers to irradiating electromagnetic waves that can influence a photopolymerizable functional group so as to initiate a polymerization reaction. Here, the term "electromagnetic waves" as used herein refers to a term generically including particle beams such as α-particle beams, proton beams, neutron beams and electron beams, as well as infrared (IR) rays, ultraviolet (UV) rays, X rays, and gamma (γ) rays.

Further, the term "IPN structure" as used herein refers to the state in which at least two cross-linked structures coexist in the pressure-sensitive adhesive. For example, when a pressure sensitive adhesive composition includes a cross-linkable acrylic resin, a multifunctional cross-linking agent, a multifunctional acrylate and a polymerization initiator, a cross-linked structure (hereinafter, referred to as "first cross-linked structure") formed by reaction of the acrylic resin and the multifunctional cross-linking agent, and another cross-linked structure (hereinafter, referred to as "second cross-linked structure") formed by a polymerization reaction of the multifunctional acrylate caused by the photo-initiator may coexist in the pressure-sensitive adhesive. However, in the present invention, the recipes of the pressure-sensitive adhesive composition for realizing the IPN structure are not limited to the aforementioned types.

Also, in the pressure-sensitive adhesive composition of the present invention, a storage modulus (G') measured at 80° C. after being cured may range from 0.05 MPa to 0.3 MPa, preferably from 0.07 MPa to 0.3 MPa, more preferably from 0.09 MPa to 0.3 MPa, and most preferably from 0.09 MPa to 0.2 MPa. The term "storage modulus" as used herein refers to a storage modulus measured in the state where the pressure-sensitive adhesive composition is cured, i.e. is prepared into the pressure-sensitive adhesive. In the present invention, a method for measuring the storage modulus is not substantially restricted. For example, the storage modulus of the pressure-sensitive adhesive may be measured by a method described in the following example. In the present invention, the storage modulus measured at 80° C. after the pressure-sensitive adhesive composition is cured is controlled within a range from 0.05 MPa to 0.3 MPa, so that the pressure-sensitive adhesive can have excellent physical properties such as endurance reliability and removability, and show excellent light transmission uniformity even when applied to a large-sized display.

Further, in the pressure-sensitive adhesive composition of the present invention, a storage modulus (G') measured at 23° C. after being cured may range from 0.07 MPa to 0.3 MPa, preferably from 0.09 MPa to 0.3 MPa, and more preferably from 0.1 MPa to 0.3 MPa. The storage modulus measured at 23° C. may also be measured by a method described in the following example. In the present invention, the storage modulus measured at 23° C. after the pressure-sensitive adhesive composition is cured is controlled within a range from 0.07 MPa to 0.3 MPa, so that the pressure-sensitive adhesive can have excellent physical properties such as endurance reliability and removability, and show excellent light transmission uniformity even when applied to a large-sized display.

In the present invention, the recipe of the pressure-sensitive adhesive composition is not substantially restricted as long as it is formulated so as to have the IPN structure after being cured and the storage modulus of the aforementioned range.

In one embodiment, the pressure-sensitive adhesive composition may include a cross-linkable acrylic resin and a multifunctional cross-linking agent. The term "cross-linkable acrylic resin" as used herein refers to an acrylic resin having a cross-linkable functional group capable of reacting with the multifunctional cross-linking agent. These components may react with each other during the drying or aging process of the pressure-sensitive adhesive composition, so that they enable impart a cross-linked structure to the pressure-sensitive adhesive.

In the present invention, the acrylic resin may have a weight-average molecular weight ($M_w$) of 1,000,000 or more. Here, the weight-average molecular weight of the acrylic resin refers to a converted value with respect to polystyrene, that is measured by gel permeation chromatography (GPC). In the present invention, the pressure sensitive adhesive composition may show excellent endurance reliability under high temperature or high humidity by controlling the acrylic resin to have the weight-average molecular weight of 1,000,000 or more. In the present invention, an upper limit of the weight-average molecular weight of the acrylic resin is not substantially restricted. In one embodiment, the weight-average molecular weight of the acrylic resin may be appropriately controlled within a range of 2,500,000 or less. In the present invention, it is possible to provide a pressure sensitive adhesive composition having superior coatablilty with maintaining excellent endurance reliability by controlling the acrylic resin to have the weight-average molecular weight of 2,500,000 or less.

In the present invention, a detailed recipe of the acrylic resin is not substantially restricted. For example, the acrylic resin may be a polymer of a monomer mixture including a (meth)acrylic acid ester monomer and a cross-linkable monomer.

Unless otherwise defined hereinafter, the term "part(s) by weight" refers to a weight ratio.

In the present invention, a specific type of the (meth)acrylic acid ester monomer included in the monomer mixture is not substantially restricted. For example, alkyl(meth)acrylate may be used. In this case, when an alkyl group included in the alkyl(meth)acrylate has an excessively long chain, the cohesive strength of the pressure-sensitive adhesive may be reduced, and thus it may be difficult to control glass transition temperature $T_g$, or tackiness. As such, it is preferable to use the alkyl(meth)acrylate having an alkyl group with 1 to 14 carbon atoms. Examples of this monomer may include methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isononyl(meth)acrylate, lauryl(meth)acrylate, and tetradecyl(meth)acrylate. In the present invention, one or a mixture of at least two selected from these monomers may be used. The monomer mixture of the present invention may include the (meth)acrylic acid ester monomer in an amount of 80 to 99.9 parts by weight, relative to the cross-linkable monomer. If the content is less than 80 parts by weight, an initial adhesion strength of the pressure-sensitive adhesive may be reduced. If the content is more than 99.9 parts by weight, the cohesive strength may be reduced to cause a problem with the durability.

The cross-linkable monomer is a monomer including a polymerizable functional group (e.g. carbon carbon double bond) and a cross-linkable functional group in its molecular structure, and therefore capable of imparting the cross-linkable functional group that can react with a multifunctional cross-linking agent to the acrylic resin, thereby serving to control the endurance reliability, tack strength and cohesive strength of the pressure-sensitive adhesive.

Examples of the cross-linkable monomer that can be used in the present invention may include, but are not limited to, a monomer containing a hydroxy group, a monomer containing a carboxyl group, a monomer containing nitrogen, and so on. Here, detailed examples of the hydroxy group-containing monomer may include 2-hydroxyethyl(meth)acrylate, 2-hydroxypropyl(meth)acrylate, 4-hydroxybutyl(meth)acrylate, 6-hydroxyhexyl(meth)acrylate, 8-hydroxyoctyl(meth)acrylate, 2-hydroxyethyleneglycol(meth)acrylate, 2-hydroxypropyleneglycol(meth)acrylate, and so on. Examples of the carboxyl group-containing monomer may include (meth)acrylic acid, 2-(meth)acryloyloxy acetic acid, 3-(meth)acryloyloxy propylic acid, 4-(meth)acryloyloxy butylic acid, acrylic acid dimer, itaconic acid, maleic acid, maleic anhydride, and so on. Examples of the nitrogen-containing monomer may include (meth)acrylamide, N-vinyl pyrrolidone, N-vinyl caprolactam, and so on. The cross-linkable monomer is not limited to these monomers. In the present invention, one or a mixture of at least two selected from these monomers may be used.

In the monomer mixture of the present invention, the cross-linkable monomer may be included in an amount of 0.1 to 20 parts by weight, relative to the (meth)acrylic acid ester monomer. If the content is less than 0.1 parts by weight, the endurance reliability of the pressure-sensitive adhesive may be reduced. If the content is more than 20 parts by weight, an excessive cross-linking reaction may occur so as to reduce the tackiness and/or peel strength.

In the present invention, the monomer mixture may further include a compound of expressed by Chemical Formula 1 below. The compound of Chemical Formula 1 may be added to control the glass transition temperature of the pressure-sensitive adhesive and provide other functionalities.

[Chemical Formula 1]

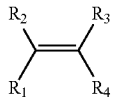

In Chemical Formula 1, $R_1$, $R_2$ and $R_3$ independently represents hydrogen or alkyl, and $R_4$ represents: cyano; phenyl substituted or unsubstituted with alkyl; acetyloxy; or $COR_5$, where $R_5$ represents glycidyloxy or amino substituted or unsubstituted with alkyl or alkoxyalkyl.

In the definitions of $R_1$ to $R_5$ of Chemical Formula 1, alkyl or alkoxy refers to alkyl or alkoxy having 1 to 8 carbon atoms, and preferably methyl, ethyl, methoxy, ethoxy, propoxy or butoxy.

Detailed examples of the monomer of Chemical Formula 1 may include, but are not limited to, one or at least two of a nitrogen-containing monomer such as (meth)acrylonitrile, (meth)acrylamide, N-methyl(meth)acrylamide, or N-butoxy methyl(meth)acrylamide; a styrene-based monomer such as styrene or methyl styrene; glycidyl(meth)acrylate; and a carboxylic acid vinyl ester such as vinyl acetate. In the case in which the monomer mixture of the present invention includes the compound of Chemical Formula 1, it is included in an amount of 20 parts by weight or less, relative to the (meth)acrylic acid ester monomer or the cross-linkable monomer. If the content of the compound is more than 20 parts by weight, the softness and/or peel strength of the pressure-sensitive adhesive may be reduced.

In the present invention, a method for preparing the acrylic resin including the components is not substantially restricted. For example, the acrylic resin may be prepared using ordinary polymerization such as solution polymerization, photo polymerization, bulk polymerization, suspension polymerization, or emulsion polymerization. In the present invention, above all, the solution polymerization may be used to prepare the acrylic resin. The solution polymerization may be carried out at a polymerization temperature of 50° C. to 140° C. by adding an initiator with each monomer mixed uniformly. An example of the initiator that can be used in this process may include an azo-based initiator such as azobisisobutyronitrile or azobiscyclohexane carbonitrile, and/or a typical initiator such as peroxide, for instance benzoyl peroxide or acetyl peroxide. The initiator may include, but is not limited to, one or a mixture of at least two selected from the initiators.

The pressure-sensitive adhesive composition of the present invention may include a multifunctional cross-linking agent capable of realizing a cross-linked structure by reacting with the acrylic resin.

A specific type of the cross-linking agent that can be used in the present invention is not substantially restricted. For example, ordinary cross-linking agents such as an isocyanate compound, an epoxy compound, an aziridine compound, and a metal chelate compound may be used. In the present invention, the cross-linking agent may include, but is not limited to, the isocyanate compound among the above compounds. Here, a specific example of the isocyanate compound may include, but is not limited to, at least one selected from the group consisting of toluene diisocyanate, xylene diisocyanate, diphenylmethane diisocyanate, hexamethylene diisocyanate, isophorone diisocyanate, tetramethylxylene diisocyanate, naphthalene diisocyanate, and a compound prepared by reacting at least one of the above isocyanate compounds with polyol (e.g. trimethylol propane). A specific example of the epoxy-based compound may include, but is not limited to, at least one selected from the group consisting of ethyleneglycol diglycidylether, triglycidylether, trimethylolpropane triglycidylether, N,N,N',N'-tetraglycidyl ethylenediamine, and glycerin diglycidylether. A detailed example of the aziridine-based compound may include, but is not limited to, at least one selected from the group consisting of N,N'-toluene-2,4-bis(1-aziridinecarboxide), N,N'-diphenylmethane-4,4'-bis(1-aziridinecarboxide), triethylene melamine, bisisoprothaloyl-1-(2-methylaziridine), and tri-1-aziridinylphosphinoxide. Further, a detailed example of the metal chelate-based compound may include, but is not limited to, a compound in which a polyvalent metal, such as aluminum, iron, zinc, tin, titanium, antimony, magnesium, and/or vanadium, is coordinated to acetyl acetone or ethyl acetoacetate.

In the pressure-sensitive adhesive composition of the present invention, the cross-linking agent may be included in an amount of 0.01 to 10 parts by weight, and preferably 0.01 to 5 parts by weight, relative to 100 parts by weight of the acrylic resin. If the content of the cross-linking agent is less than 0.01 parts by weight, the cohesive strength of the pressure-sensitive adhesive may be reduced. If the content of the cross-linking agent is more than 10 parts by weight, peeling or lifting between layers may occur, and thus the endurance reliability may be reduced.

Further, the pressure-sensitive adhesive composition of the present invention may further include multifunctional acrylate and a polymerization initiator. The multifunctional acrylate may impart a second cross-linked structure to the pressure-sensitive adhesive through a polymerization reaction caused by the polymerization initiator.

A kind of the multifunctional acrylate that can be used in the present invention is not substantially restricted. For example, the multifunctional acrylate may include, but is not limited to, bifunctional acrylate such as 1,4-butanediol di(meth)acrylate, 1,6-hexanediol di(meth)acrylate, neopentylglycol di(meth)acrylate, polyethyleneglycol di(meth)acrylate, neopentylglycol adipate di(meth)acrylate, hydroxypivalic acid neopentylglycol di(meth)acrylate, dicyclopentanyl di(meth)acrylate, caprolactone-modified dicyclopentenyl di(meth)acrylate, ethyleneoxide-modified di(meth)acrylate, di(meth)acryloxy ethyl isocyanurate, allylation cyclohexyl di(meth)acrylate, tricyclodecandimethanol(meth)acrylate, dimethylol dicyclopentane di(meth)acrylate, ethyleneoxide-modified hexahydrophthalic acid di(meth)acrylate, tricyclodecane dimethanol(meth)acrylate, neopentylglycol-modified trimethylpropane di(meth)acrylate, adamantine di(meth)acrylate, or 9,9-bis[4-(2-acryloyloxyethoxy)phenyl]fluorine; trifunctional acrylate such as trimethylolpropane tri(meth)acrylate, dipentaerythritol tri (meth)acrylate, propionic acid-modified dipentaerythritol tri (meth)acrylate, pentaerythritol tri(meth)acrylate, propyleneoxide-modified trimethylolpropane tri(meth)acrylate, trifunctional urethane (meth)acrylate, or tris(meth)acryloxyethylisocyanurate; tetrafunctional acrylate such as diglycerin tetra(meth)acrylate or pentaerythritol tetra(meth)acrylate; pentafunctional acrylate such as propionic acid-modified dipentaerythritol penta(meth)acrylate; and hexafunctional acrylate such as dipentaerythritol hexa(meth) acrylate, caprolactone-modified dipentaerythritol hexa(meth)acrylate, or urethane (meth)acrylate (e.g. a reaction product of isocyanate monomer and trimethylolpropane tri(meth)acrylate)

In the present invention, one or a mixture of at least two selected from the above multifunctional acrylates may be used. It is particularly preferable to use, but not limited to, the acrylate having a molecular weight of less than 1,000 and at least three functional groups in terms of realizing more excellent durability.

In the present invention, the multifunctional acrylate preferably includes a cyclic structure and/or a urethane linkage in its molecular structure. Here, the cyclic structure included in the acrylate is not substantially restricted, and thus may include any one of an carbocyclic or heterocyclic structure, and a monocylic or polycyclic structure. A detailed example of the cyclic structure included in the multifunctional acrylate may include a cyclic structure of cycloalkyl having 3 to 12 carbon atoms, and preferably 3 to 8 carbon atoms, such as cyclopentane, cyclohexane, or cycloheptane. The number of cyclic structures included in the acrylate may be at least one, preferably from one to five, and more preferably from one to three. Further, the cyclic structure may include at least one hetero atom such as O, S or N.

A specific example of the multifunctional acrylate including the cyclic structure, which can be used in the present invention, may include, but is not limited to, a monomer having an isocyanurate structure such as tris(meta)acryloxyethyl isocyanurate, isocyanurate-modified urethane acrylate (e.g. a compound prepared by reaction an isocyanate compound having a cyclic structure in its molecular structure (e.g. isophorone diisocyanate) with an acrylate (e.g. trimethylolpropane tri(meth)acrylate or pentaerythritol tri(meth) acrylate, or the like)), or the like.

In the pressure-sensitive adhesive composition of the present invention, the multifunctional acrylate may be included in an amount of 5 to 40 parts by weight relative to 100 parts by weight of the acrylic resin. If the content of the multifunctional acrylate is less than 5 parts by weight, the durability may be reduced under a high-temperature condition, or an effect of inhibiting the light leakage may be reduced. If the content of the multifunctional acrylate is more than 40 parts by weight, high-temperature durability may be reduced.

In the pressure-sensitive adhesive composition of the present invention, a kind of the polymerization initiator capable of inducing a polymerization reaction of the multifunctional acrylate is not substantially restricted. For example, the polymerization initiator may include at least one selected from the group consisting of a photo-initiator and a thermal initiator. Particularly, it is preferable to use the photo-initiator and the thermal initiator at the same time. In this manner, the photo-initiator and the thermal initiator are simultaneously included in the pressure-sensitive adhesive composition, so that various physical properties of the pressure-sensitive adhesive including low light leakage can be further improved. This polymerization initiator may be included in an amount of 0.2 to 20 parts by weight relative to 100 parts by weight of the acrylic resin as mentioned above.

In the present invention, any photo-initiator may be used as long as it can induce the polymerization reaction of the multifunctional acrylate in the process where it is cured by light irradiation, and thereby realize the second cross-linked structure. A kind of the photo-initiator that can be used in the present invention is not substantially restricted. In the present invention, for example, the photo-initiator may include a benzoin-based, hydroxy ketone-based, aminoketone-based or phosphine oxide-based photo-initiator. In detail, the photo-initiator may include benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-on, 1-hydroxycyclohexylphenylketone, 2-methyl-1-[4-(methylthio)phenyl]-2-morpholino-propane-1-on, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyephenyl]propanone], 2,4,6-trimethylbenzoyl-diphenyl-phosphinoxide, and so on. In the present invention, the photo-initiator may include, but is not limited to, one or a mixture of at least two selected from the photo-initiators.

In the pressure-sensitive adhesive composition of the present invention, the photo-initiator may be included in an amount of 0.2 to 20 parts by weight, preferably, 0.2 to 10 parts by weight, and more preferably 0.2 to 5 parts by weight relative to 100 parts by weight of the acrylic resin. More specifically, the photo-initiator may be included in an amount of 0.2 to 20 parts by weight relative to 100 parts by weight of the multifunctional acrylate as mentioned above. When the content of the photo-initiator is beyond this range, the reaction of the multifunctional acrylate may not be smoothly carried out, or the physical properties of the pressure-sensitive adhesive may be degraded due to residual components after the reaction.

The thermal initiator that can be used in the present invention is not substantially restricted either, and thus may be selected properly in consideration of the physical properties to be realized. For example, in the present invention, the thermal initiator having a 10 hours half-life temperature of 40° C. to 100° C. may be used. By setting the half-life temperature of the thermal initiator to this range, it is possible to secure a pot-life sufficiently, and to properly maintain a dry temperature for decomposition of the thermal initiator as well.

A kind of the thermal initiator that can be used in the present invention is not substantially restricted as long as the thermal initiator has the aforementioned physical properties. For example, a typical initiator such as an azo-based compound, a peroxide-based compound, or a redox-based compound may be used. Here, an example of the azo-based compound may include, but is not limited to, 2,2'-azobis(2-methylbutyronitrile), 2,2'-azobis(isobutyronitrile), 2,2'-azobis(2,4-dimethylvaleronitrile), 2,2'-azobis-2-hydroxymethylpropionitrile, dimethyl-2,2'-azobis(2-methylpropionate), or 2,2'-azobis(4-methoxy-2,4-dimethylvaleronitrile). An example of the peroxide-based compound may include, but is not limited to, inorganic peroxide such as potassium persulfate, diammonium peroxodisulphate, or hydrogen peroxide; and organic peroxide such as diacyl peroxide, peroxy dicarbonate, peroxy ester, tetramethylbutylperoxy neodecanoate (e.g. Perocta N. Dak., produced by Nippon Oils and Fats Kabushiki Kaisha (NOF)), bis(4-butylcyclohexyl)peroxy dicarbonate (e.g. Peroyl TCP, produced by NOF), di(2-ethylhexyl)peroxy carbonate, butylperoxy neodecarnoate (e.g. Perbutyl N. Dak., produced by NOF), dipropyl peroxy dicarbonate (e.g. Peroyl NPP, produced by NOF), diisopropyl peroxy dicarbonate (Peroyl IPP, produced by NOF), diethoxyethyl peroxy dicarbonate (e.g. Peroyl EEP, produced by NOF), diethoxyhexyl peroxy dicarbonate (e.g. Peroyl OEP, produced by NOF), hexyl peroxy dicarbonate (e.g. Perhexyl N. Dak., produced by NOF), dimethoxybutyl peroxy dicarbonate (e.g. Peroyl MBP, produced by NOF), bis(3-methoxy-3-methoxybutyl)peroxy dicarbonate (e.g. Peroyl SOP, produced by NOF), dibutyl peroxy dicarbonate, dicetyl peroxy dicarbonate. dimyristyl peroxy dicarbonate. 1,1,3,3-tetramethylbutyl peroxypivalate, hexyl peroxy pivalate (e.g. Perhexyl PV, produced by NOF), butyl peroxy pivalate (e.g. Perbutyl, produced by NOF), trimethyl hexanoyl peroxide (e.g. Peroyl 355, produced by NOF), dimethyl hydroxybutyl peroxyneodecanoate (e.g. Luperox 610M75, produced by Atofina), amyl peroxy pivalate (e.g. Luperox 546M75, produced by Atofina), butyl peroxy neodecanoate (e.g. Luperox 10M75, produced by Atofina), t-butylperoxy neoheptanoate, t-butylperoxy pivalate, t-amylperoxy-2-ethylhexanoate, lauryl peroxide, dilauroyl peroxide, didecanoyl peroxide, benzoyl peroxide, or dibenzoyl peroxide. An example of the redox-based compound may include, but is not limited to, a mixture of the peroxide-based compound and a reductant. In the present invention, one or a mixture of two or more of the azo-based compounds, peroxide-based compounds, or redox-based compounds may be used.

In the pressure-sensitive adhesive composition of the present invention, the thermal initiator may be included in an amount of 0.2 to 20 parts by weight, and preferably 0.2 to 5 parts by weight relative to 100 parts by weight of the acrylic resin. If the content of the thermal initiator is less than 0.2 parts by weight, the low light leakage of the pressure-sensitive adhesive may be reduced. If the content of the thermal initiator is more than 20 parts by weight, the endurance durability of the pressure-sensitive adhesive may be reduced.

The pressure-sensitive adhesive composition of the present invention may further include a silane coupling agent. Such a coupling agent improves adhesiveness and adhesion stability between the pressure-sensitive adhesive and a glass substrate, so that it can improve heat resistance and humidity resistance. Further, when the pressure-sensitive adhesive is left under high temperature or high humidity for a long time, the coupling agent may serve to improve adhesion reliability. Examples of the coupling agent that can be used in the present invention may include, but are not limited to, γ-glycidoxypropyltriethoxy silane, γ-glycidoxypropyltrimethoxy silane, γ-glycidoxypropylmethyldiethoxy silane, 3-mercaptopropyl trimethoxy silane, vinyltrimethoxy silane, vinyl triethoxy silane, γ-methacryloxypropyl trimethoxy silane, γ-methacryloxypropyl triethoxy silane, γ-aminopropyl trimethoxy silane, γ-aminopropyl triethoxy silane, 3-isocyanatopropyl triethoxy silane, γ-acetoacetatepropyl trimethoxy silane, γ-acetoacetatepropyl triethoxy silane, β-cyanoacetyl trimethoxy silane, β-cyanoacetyl triethoxy silane, and acetoacetoxy trimethoxy silane. One or a mixture of two or more of the foregoing coupling agents may be used. In the present invention, the coupling agent may include, but is not limited to, a silane coupling agent containing an acetoacetate group or a β-cyanoacetyl group. In the pressure-sensitive adhesive composition of the present invention, the silane-based coupling agent may be included in an amount of 0.01 to 5 parts by weight, and preferably 0.01 to 1 parts by weight relative to 100 parts by weight of the acrylic resin. If the content of the coupling agent is less than 0.01 parts by weight, an effect of increasing the tack strength may become insignificant. If the content of the coupling agent is more than 5 parts by weight, the endurance reliability may be reduced.

Further, the pressure-sensitive adhesive composition of the present invention may additionally include a tackifier resin in order to control tack performance. A kind of the tackifier resin is not substantially restricted. For example, one or a mixture of two or more selected from a (hydrogenated) hydrocarbon-based resin, a (hydrogenated) rosin resin, a (hydrogenated) rosin ester resin, a (hydrogenated) terpene resin, a (hydrogenated) terpene phenol resin, a polymerized rosin resin, and a polymerized rosin ester resin may be used. The tackifier resin may be included in an amount of 1 to 100 parts by weight relative to 100 parts by weight of the acrylic resin. If the content of the tackifier resin is less than 1 part by weight, an effect of adding the tackifier resin may become insignificant. If the content of the tackifier resin is more than 100 parts by weight, an effect of improving compatibility and/or cohesive strength may be reduced.

Further, the pressure-sensitive adhesive composition of the present invention may further include at least one additive selected from the group consisting of an epoxy resin, a hardner, a UV stabilizer, an antioxidant, a coloring agent, a reinforcing agent, a filler, a defoaming agent, a surfactant, and a plasticizer to the extent that it does not influence the effects of the present invention.

The present invention is also directed to a polarizing plate, which includes a polarizing film and a pressure-sensitive adhesive layer formed on one or both surfaces of the polarizing plate and containing a cured product of the pressure-sensitive adhesive composition of the present invention.

A kind of the polarizing film used in the present invention is not substantially restricted. Thus, a typical kind of polarizing film known in this field may be used. For example, the polarizing film may include a polarizer and a protective film formed on one or both surfaces of the polarizer.

A kind of the polarizer included in the polarizing plate of the present invention is not substantially restricted. For example, a typical kind of polarizer known in this field, such as a polyvinyl alcohol polarizer, may be employed without limitation.

The polarizer is a functional film or sheet capable of extracting only light vibrating in one direction from incident light vibrating in several directions. Such a polarizer may be a film in which a dichromatic colorant is adsorbed to and oriented on a polyvinyl alcohol resin film. A polyvinyl alcohol resin composing the polarizer may be obtained by gelation of a polyvinyl acetate resin. In this case, the polyvinyl acetate resin usable herein may include a homopolymer of a vinyl acetate, as well as a copolymer of vinyl acetate and a monomer copolymerizable with vinyl acetate. An example of the monomer copolymerizable with vinyl acetate may include, but is not limited to, one or a mixture of two or more selected from unsaturated carboxylic acids, olefins, vinyl ethers, unsaturated sulfonic acids, and ammonium group-containing acrylamides. The polyvinyl alcohol resin may typically have a degree of gelation of 85 mol % to 100 mol %, and preferably 98 mol % or more. The polyvinyl alcohol resin may be further modified, and may include, for example, polyvinylformal or polyvinylacetal modified with aldehydes. The polyvinyl alcohol resin may typically have a degree of polymerization of 1,000 to 10,000, and preferably 1,500 to 5,000.

The polyvinyl alcohol resin may be used to form a film, which is used as a template film of the polarizer. A method of forming the film using the polyvinyl alcohol-based resin is not substantially restricted. Thus, a typical method known in this field may be used. A thickness of the template film formed from the polyvinyl alcohol resin is not substantially restricted, and may be properly controlled, for instance, within a range from 1 μm to 150 μm. In consideration of, for instance, easy elongation, the thickness of the template film may be controlled to 10 μm or more.

The polarizer may be manufactured by elongating polyvinyl alcohol resin film (e.g. uniaxial elongation); dying and adsorbing the dichromatic colorant on the elongated polyvinyl alcohol resin film; treating the polyvinyl alcohol resin film, to which the dichromatic colorant is adsorbed, with an aqueous boric acid solution; and washing the polyvinyl alcohol resin film with water after the treatment with the boric acid solution. Here, the dichromatic colorant may include iodine or a dichromatic organic dye.

Further, the polarizing film of the present invention may further include a protective film formed on one or both surfaces of the polarizer. A kind of the protective film that can be included in the polarizing film of the present invention is not substantially restricted. In one embodiment, the protective film may be single-layered film or multi-layered film constituted from at least one selected from the group consisting of a cellulose film such as a triacetylcellulose film, a polyester film such as a polyethyleneterephthalate film, a polycarbonate film, a polyethersulfone film and/or a polyolefin film such as a polyolefin film having cyclic or norbornene structure, polyethylene film or a polypropylene film, or a polyolefin film such as an ethylene propylene copolymer film. Here, the thickness of the protecting film is not substantially restricted, and thus the protecting film may be formed at a typical thickness.

In the present invention, a method for forming the pressure-sensitive adhesive layer on the polarizing film is not substantially restricted. In one embodiment, a method of coating and curing a polarizing film with a pressure-sensitive adhesive composition (i.e. a coating solution) using a typical means such as a bar coater, or a method of coating and curing a pressure sensitive adhesive composition on the surface of a releasable substrate, and transferring the cured pressure-sensitive adhesive layer to a polarizing film may be used.

In the present invention, the process for forming the pressure-sensitive adhesive layer may be preferably performed after eliminating a volatile component or a bubble inducing component such as a reaction residual in the pressure-sensitive adhesive composition (i.e. the coating solution) sufficiently. Thereby, problems in which the modulus is excessively lowered since a cross-linking density, molecular weight, and the like, of the pressure-sensitive adhesive become excessively lowered, and thus, or the bubbles existed between the glass substrate and the pressure-sensitive adhesive layer are expanded under high temperature, and thus are formed into internal scattering objects can be prevented.

Further, in the present invention, the method for curing the pressure-sensitive adhesive composition when the polarizing plate is manufactured is not substantially restricted either. For example, such a method may be performed by irradiation of light, for instance UV rays, capable of inducing activation of the photo-initiator included in the pressure-sensitive adhesive composition.

In the present invention, when the irradiation of UV rays is applied, the irradiation of UV rays may be carried out by use of lighting means such as a high-pressure mercury lamp, an electrodeless lamp (a.k.a. induction lamp), or a xenon lamp. Further, in the UV curing method, a dose of UV rays is not substantially restricted as long as it is controlled so as to be sufficiently cured without damaging various physical properties. For example, the UV rays may have illuminance of 50 mW/cm$^2$ to 1,000 mW/cm$^2$, and a dose of 50 mJ/cm$^2$ to 1,500 mJ/cm$^2$.

In the present invention, the pressure-sensitive adhesive layer formed through the foregoing processes may have a gel content of 80 wt % or more, and preferably 90 wt % or more, as expressed by Equation 1 below.

$$\text{Gel Content (wt \%)} = B/A \times 100 \qquad \text{[Equation 1]}$$

where A indicates the weight of the pressure-sensitive adhesive, and B indicates the weight of the insoluble component in the pressure-sensitive adhesive, which are measured after immersing the pressure-sensitive adhesive in ethyl acetate at room temperature for 48 hours, and then drying the component that is not dissolved in the ethyl acetate.

If the gel content is less than 80 wt %, the endurance reliability of the pressure-sensitive adhesive may be reduced under high temperature and/or high humidity.

In the present invention, an upper limit of the gel content is not substantially restricted. For example, the upper limit of the gel content may be properly controlled within a range of 90 wt % or less in consideration of the stress relaxation characteristic, etc. of the pressure-sensitive adhesive.

Further, the polarizing plate of the present invention may additionally include at least one functional layer selected from the group consisting of a protective layer, a reflective layer, an anti-glare layer, a retardation plate, a wide viewing angle compensation film, and a brightness enhancement film.

The present invention is also directed to a liquid crystal display (LCD) including a liquid crystal panel on one or both surfaces of which the polarizing plate is attached.

A type of the liquid crystal panel included in the LCD of the present invention is not substantially restricted. For example, the liquid crystal panel may be any types of known liquid crystal panels, including a passive matrix type such as a twisted nematic (TN) type, a super twisted nematic (STN) type, a ferroelectric (F) type, or a polymer dispersed (PD) type; an active matrix type such as a two terminal type or a three terminal type; an in-plane switching (IPS) type; and a vertical alignment (VA) type. Further, the other components included in the LCD and their manufacturing methods are not substantially restricted. Thus, typical components known in this field may be employed without limitation.

EXAMPLES

Hereinafter, the present invention will be described in greater detail with reference to the following examples and comparative examples, and the scope thereof is not restricted to these examples.

Preparation Example 1: Preparation of Acrylic Resin A

A monomer mixture including 99 parts by weight of n-butyl acrylate (n-BA) and 1.0 parts by weight of hydroxyethyl methacrylate (HEMA) was added to a 1 L reactor, in which nitrogen gas was refluxed and on which a cooler was installed in order to easily control temperature. Then, 120 parts by weight of ethyl acetate (EAc) was added to the reactor as a solvent, and the reactor was purged with nitrogen gas for 60 minutes in order to remove oxygen. Subsequently, the reactor was maintained at 60° C., and 0.03 parts by weight of azobisisobutyronitrile (AIBN) was added to the reactor as a reaction initiator, and reacted for 8 hours. After the reaction was completed, the reaction product was diluted with ethyl acetate (EAc). Thereby, an acrylic resin having a solid content of 15 wt %, a weight-average molecular weight of 1,600,000, and a molecular weight distribution of 4.9 was prepared Preparation Example 2: Preparation of Low Molecular Weight Acrylic Polymer B A low molecular weight acrylic polymer having a solid content of 35 wt %, a weight-average molecular weight of 16,000, and a molecular weight distribution of 2.5 was prepared according to the process of Preparation Example 1, except that the monomer mixture including only n-butyl acrylate (n-BA) was used and 1.5 parts by weight of n-dodecyl mercaptan (n-DDM) was further used to control a molecular weight.

Example 1

Preparation of Pressure-Sensitive Adhesive Composition

Relative to 100 parts by weight of the acrylic resin prepared in Preparation Example 1, 15 parts by weight of hexafunctional urethane acrylate (isocyanate-modified urethane acrylate, a reaction product of isocyanate and pentaerythritol triacrylate), 10 parts by weight of trifunctional urethane acrylate (trisacryloxyethyl isocyanurate), 1.0 parts by weight of XDI isocyanate cross-linking agent (D110N, produced by Mitsui Takeda, (JP)), 1.4 parts by weight of hydroxycyclohexylphenyl ketone (produced by Ciba Specialty Chemicals (Swiss)), and 0.3 parts by weight of silane coupling agent having β-cyanoacetyl group (M812, produced by LG Chemical Ltd. (KR)) were mixed, and the concentration of a solid content was controlled to 15% so as to prepare a pressure sensitive adhesive composition.

Preparation of Adhesive Polarizing Plate

The prepared pressure-sensitive adhesive composition was coated on a polyethyleneterephthalate (PET) (MRF-38, manufactured by Mitsubishi Corporation) film which had a thickness of 38 μm and had been subjected to a releasing treatment as a release sheet, in such a state that the coating layer had a thickness of 25 μm after being dried. Afterwards, the coated film was dried in an oven at 110° C. for 3 minutes. Then, the dried film having the coating layer thereon was stored in a constant temperature and humidity chamber (23° C. and 55% relative humidity (RH)) for about one day, and laminated the coating layer on the wide view (WV) surface of a polarizing plate, in which a WV liquid crystal layer was coated on one surface thereof. Then, the laminated film was treated with UV rays under the following conditions. Thereby, an adhesive polarizing plate was prepared.

UV irradiator: high-pressure mercury lamp
Irradiation conditions: Illuminance: 600 mW/cm$^2$
Dose: 150 mJ/cm$^2$ Examples 2 and 3, and Comparative Examples 1 Through 4

Pressure-sensitive adhesive polarizing plates were prepared by the same method as Example 1, except that the components as shown in Table 1 below were mixed to prepare pressure-sensitive adhesive compositions.

TABLE 1

|  | Examples | | | Comparative Examples | | | |
| --- | --- | --- | --- | --- | --- | --- | --- |
|  | 1 | 2 | 3 | 1 | 2 | 3 | 4 |
| Acrylic Resin A | 100 | 100 | 100 | 100 | 100 | 100 | 100 |
| Low Molecular Weight Acrylic Polymer B | — | — | — | — | — | — | 30 |
| Multifunctional A | 15 | 15 | 10 | — | 25 | — | 10 |
| Multifunctional B | 10 | 5 | 10 | 5 | 15 | — | 10 |
| Cross-linking Agent | 1.0 | 1.0 | 1.0 | 1.0 | 1.0 | 5.0 | 1.0 |
| Irg184 | 1.4 | 1.2 | 1.0 | 1.0 | 1.0 | — | 1.0 |
| M812 | 0.3 | 0.3 | 0.3 | 0.3 | 0.3 | 0.3 | 0.3 |

Unit of content: parts by weight
Multifunctional A: hexafunctional urethane acrylate
Multifunctional B: trifunctional acrylate(trisacryloxy ethyl isocyanurate)
Cross-linking Agent: XDI-based isocyanate(D110N, Mitsui Takeda (JP))
Irg184: photo-initiator(hydroxy cyclohexylphenyl ketone (Ciba Specialty Chemicals (Swiss))
M812: β-cyanoacetyl group containing silane coupling agent(LG Chemical Ltd. (KR))

With respect to the pressure-sensitive adhesives or the polarizing plates prepared in Examples and Comparative Examples, their physical properties were measured, and are shown in Table 1.

1. Measurement of Storage Modulus

The pressure-sensitive adhesive composition prepared in each of Examples and Comparative Examples was coated between two sheets of release films, irradiated with UV rays, and aged in constant temperature and humidity conditions (23° C. and 50% RH) for seven days. Thereby, a pressure-sensitive adhesive having a thickness of about 25 μm was prepared. Then, the pressure-sensitive adhesive between the release films was formed into columnar specimens having a size of 8 mm×1 mm. Each specimen was placed between parallel plates of a dynamical rheometer (Advanced Rheometric Expansion System (ARES) and Rheometric Dynamic Analyzer (RDA, TA Instruments Inc.)). While shear stress was applied to the specimen at a frequency of 1 Hz, storage moduli of the specimen were measured at 23° C. and 80° C., respectively.

2. Measurement of Gel Fraction

After UV irradiation, the prepared pressure-sensitive adhesive layer was left in a constant temperature and humidity chamber (23° C. and 60% RH) for about 7 days. Then, about 0.3 g of the pressure sensitive adhesive was put in a stainless wire net of 200 meshes, immersed in 100 ml of ethyl acetate, and stored in a dark room at room temperature for 3 days. Then, the component (insoluble component) of the pressure-sensitive adhesive, which was not dissolved in the ethyl acetate was separated, was dried in an oven at 70° C. for 4 hours, and was subjected to weight measurement. Then, the measured weight was applied to Equation 1 above, and thereby the gel fraction was measured.

3. Measurement of Adhesion Strength and Removability

The pressure sensitive adhesive polarizing plates prepared in Examples and Comparative Examples were each cut to a size of 25 mm×100 mm (width×length) to prepare a sample. The sample was adhered to an alkali-free glass using a laminator after the release film was removed. Then, the adhered sample was pressed in an autoclave (50° C. and 5 atm) for about 20 minutes, and stored under constant temperature and humidity conditions (23° C., 50% RH) for 4 hours. Then, the adhesion strength was measured under the following conditions: a peeling speed of 300 mm/min and a peeling angle of 180° using a texture analyzer (Stable Micro Systems Ltd. (UK)); and the removability was evaluated according to the following criteria.

<Removability evaluation criteria>

○: the adhesion strength after 1 day was 800 N/25 mm or less.

Δ: the adhesion strength after 1 day was 1,000 N/25 mm or more.

X: the adhesion strength after 1 day was 2,000 N/25 mm or more.

4. Evaluation of Endurance Reliability

The pressure sensitive adhesive polarizing plates were each cut to a size of 180 mm×250 mm (width×length) to prepare a sample. The sample was attached to a 19 inch panel using a laminator, pressed in an autoclave (50° C. and 5 atm) for about 20 minutes, and stored under constant temperature and humidity conditions (23° C. and 50% RH) for 24 hours. Thereby, a specimen was prepared. Then, to evaluate moisture-heat resistance of the prepared specimens, the specimens were left under conditions of 60° C. and 90% RH for 500 hours, and checked for bubbling or peeling. Also, to evaluate heat-resistance, the specimens were left at 90° C. for 500 hours, and checked for bubbling or peeling. To evaluate the endurance reliability, the specimens were left at room temperature for 24 hours, and then the endurance reliability was evaluated.

<Endurance reliability evaluation criteria>

○: neither bubbling nor peeling occurred.

Δ: bubbling and/or peeling occurred slightly.

X: bubbling and/or peeling occurred considerably.

5. Evaluation of Light Transmission Uniformity

The light transmission uniformity was measured according to the following method. First, the pressure sensitive adhesive polarizing plate prepared in each of Examples and Comparative Examples was attached to a 22 inch monitor (available from LG Philips LCD), stored under constant temperature and humidity conditions (23° C. and 50% RH) for 1 day, and left in an oven at 80° C. for 240 hours. Afterward, the light transmission uniformity was evaluated at four edges and a central portion of the monitor. To evaluate the light transmission uniformity, the brightness of the monitor was measured at regular intervals in vertical and horizontal directions on the basis of the central portion of the monitor using a spectroradiometer (CS-2000, produced by KONICA MINOLTA (JP)), and then an increasing ratio of brightness relative to the central portion of the monitor was calculated. It can be estimated as the greater the brightness increasing ratio in the vertical or horizontal direction, the more the light leakage.

The results measured by the aforementioned methods are arranged and shown in Table 2.

TABLE 2

|  | Examples | | | Comparative Examples | | | |
| --- | --- | --- | --- | --- | --- | --- | --- |
|  | 1 | 2 | 3 | 1 | 2 | 3 | 4 |
| Storage Modulus (80° C.)(MPa) | 0.18 | 0.13 | 0.1 | 0.045 | 0.4 | 0.1 | 0.03 |
| Storage Modulus (23° C.)(MPa) | 0.25 | 0.15 | 0.12 | 0.06 | 0.5 | 0.12 | 0.1 |
| Gel fraction (%) | 95 | 96 | 93 | 92 | 98 | 82 | 65 |
| Adhesion strength (N/25 mm) | 280 | 320 | 400 | 540 | 50 | 65 | 350 |
| Removability | ○ | ○ | ○ | Δ | ○ | ○ | ○ |
| Heat resistance | ○ | ○ | ○ | X | X | X | Δ |
| Moisture-heat resistance | ○ | ○ | ○ | Δ | X | X | X |
| Light transmission uniformity (vertical) (%) | 27 | 35 | 29 | 345 | 18 | 56 | 156 |
| Light transmission uniformity (horizontal) (%) | 35 | 42 | 32 | 190 | 15 | 73 | 273 |

As can be seen from the results of Table 2 above, Examples 1 through 3 showed excellent adhesion strength, removability, and endurance reliability, as well as excellent light transmission uniformity even when applied to a large monitor having a size of 26 inches.

In contrast, Comparative Example 1, in which the storage modulus of the pressure-sensitive adhesive was low, showed that the physical properties such as endurance reliability and removability were degraded, and the light leakage was greatly generated from the upper and lower sides and left and right sides of the monitor, even though the IPN structure was imparted thereto. Further, Comparative Example 2, in which the storage modulus of the pressure-sensitive adhesive was high, showed that the adhesion strength and endurance reliability of the pressure-sensitive adhesive were greatly reduced. Also, Comparative Example 3, in which the storage modulus was within a range of the present invention but the IPN structure was not realized, showed that the endurance reliability of the pressure-sensitive adhesive was greatly reduced. Comparative Example 4, in which the storage modulus at 80° C. was low, showed that the light leakage was greatly generated from the upper and lower sides and left and right sides of the monitor, and the other physical properties such as endurance reliability were greatly reduced.

In the present invention, provided is a pressure-sensitive adhesive which can effectively prevent the light leakage resulting from dimensional changes of the polarizing plate, and the like, and exhibit excellent endurance reliability even when it is used or stored for a long time. Further, in the present invention, provided is the pressure-sensitive adhesive composition or the pressure-sensitive adhesive which can exhibit excellent physical properties, such as removability, workability, and the like.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A polarizing plate, comprising:
   a polarizing film; and
   a pressure-sensitive adhesive layer that is formed on one or both surfaces of the polarizing film and that is a cured product of a pressure-sensitive adhesive composition,
   wherein the pressure-sensitive adhesive composition includes an interpenetrating polymer network structure in a cured state,
   wherein the interpenetrating polymer network structure comprises at least two crosslinked structures including a crosslinked structure formed by reaction of a crosslinkable acrylic resin and a multifunctional crosslinking agent and a crosslinked structure formed by a reaction of a multifunctional acrylate and a polymerization initiator, wherein the multifunctional acrylate comprises both a trifunctional acrylate and a hexafunctional acrylate, wherein a molecular weight of the multifunctional acrylate is less than 1,000, wherein the multifunctional acrylate is comprised in the pressure-sensitive adhesive composition in an amount of 10 to 40 parts by weight relative to 100 parts by weight of the acrylic resin;
   and wherein the pressure-sensitive adhesive composition has a storage modulus of 0.05 MPa to 0.18 MPa at 80° C. and a storage modulus of 0.07 MPa to 0.25 MPa at 23° C. in a cured state.

2. The polarizing plate according to claim 1, wherein the pressure sensitive adhesive composition has a storage modulus of 0.07 MPa to 0.18 MPa at 80° C. in a cured state.

3. The polarizing plate according to claim 1, wherein the crosslinkable acrylic resin is a polymer of a monomer mixture comprising (meth)acrylic acid ester monomer and crosslinkable monomer.

4. The polarizing plate according to claim 1, wherein the multifunctional crosslinking agent comprises at least one selected from the group consisting of an isocyanate compound, an epoxy compound, an aziridine compound, and a metal chelate compound.

5. The polarizing plate according to claim 1, wherein the multifunctional crosslinking agent is comprised in the pressure-sensitive adhesive composition in an amount of 0.01 to 10 parts by weight relative to 100 parts by weight of the acrylic resin.

6. The polarizing plate according to claim 1, wherein the multifunctional acrylate includes a cyclic structure or a urethane linkage in its molecular structure.

7. The polarizing plate according to claim 1, wherein the multifunctional acrylate is comprised in the pressure-sensitive adhesive composition in an amount of 20 to 40 parts by weight relative to 100 parts by weight of the acrylic resin.

8. The polarizing plate according to claim 1, wherein the amount of the hexafunctonal acrylate is greater than the amount of the trifunctional acrylate.

9. The polarizing plate according to claim 1, wherein the polymerization initiator is a photo-initiator.

10. The polarizing plate according to claim 9, wherein the photo-initiator comprises at least one selected from the group consisting of benzoin, benzoin methylether, benzoin ethylether, benzoin isopropylether, benzoin n-butylether, benzoin isobutylether, acetophenone, dimethylamino acetophenone, 2,2-dimethoxy-2-phenylacetophenone, 2,2-diethoxy-2-phenylacetophenone, 2-hydroxy-2-methyl-1-phenylpropane-1-on, 1-hydroxycyclohexylphenylketone, 2-methyl-1-[4-(methylthio)phenyl]-2-morpholino-propane-1-on, 4-(2-hydroxyethoxy)phenyl-2-(hydroxy-2-propyl)ketone, benzophenone, p-phenylbenzophenone, 4,4'-diethylaminobenzophenone, dichlorobenzophenone, 2-methylanthraquinone, 2-ethylanthraquinone, 2-t-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyldimethylketal, acetophenone dimethylketal, p-dimethylamino benzoic acid ester, oligo[2-hydroxy-2-methyl-1-[4-(1-methylvinyl)phenyl]propanone], and 2,4,6-trimethylbenzoyl-diphenyl-phosphinoxide.

11. The polarizing plate according to claim 1, wherein the polymerization initiator is comprised in the pressure-sensitive adhesive composition in an amount of 0.2 to 20 parts by weight relative to 100 parts by weight of the acrylic resin.

12. The polarizing plate according to claim 1, wherein the pressure sensitive adhesive composition further comprises a β-cyanoacetyl group containing silane coupling agent.

13. The polarizing plate according to claim 1, wherein the pressure sensitive adhesive composition further comprises a tackifier resin.

14. The polarizing plate according to claim 1, wherein the polarizing film comprises a polarizer and a protective film formed on one or both surfaces of the polarizer.

15. A liquid crystal display, comprising a liquid crystal panel, on one or both surfaces of which the polarizing plate as in claim 1 is attached.

* * * * *